(12) United States Patent
Blatt et al.

(10) Patent No.: US 10,903,026 B2
(45) Date of Patent: Jan. 26, 2021

(54) MODULAR KEYBOARD

(71) Applicant: HEWLETT-PACKARD DEVELOPMENT COMPANY, L.P., Houston, TX (US)

(72) Inventors: David Isaac Blatt, Houston, TX (US); Jack Hung, Taipei (TW); Jerry Hung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/092,920

(22) PCT Filed: Aug. 3, 2016

(86) PCT No.: PCT/US2016/045327
§ 371 (c)(1),
(2) Date: Oct. 11, 2018

(87) PCT Pub. No.: WO2018/026361
PCT Pub. Date: Feb. 8, 2018

(65) Prior Publication Data
US 2019/0164704 A1    May 30, 2019

(51) Int. Cl.
*H01H 13/705* (2006.01)
*H01H 13/86* (2006.01)
*H01H 13/04* (2006.01)
*H01H 9/20* (2006.01)
(Continued)

(52) U.S. Cl.
CPC ........... *H01H 13/86* (2013.01); *G06F 3/0202* (2013.01); *H01H 9/02* (2013.01); *H01H 9/20* (2013.01); *H01H 13/04* (2013.01); *H01H 2223/012* (2013.01); *H01H 2223/014* (2013.01); *H01H 2223/022* (2013.01); *H01H 2223/028* (2013.01); *H01H 2223/034* (2013.01)

(58) Field of Classification Search
CPC .... H01H 13/10; H01H 13/14; H01H 2233/07; H01H 13/705; H01H 3/125; H01H 13/04; H01H 13/20; H01H 2223/034; H01H 2233/002; H01H 2239/032; H01H 2223/056; H01H 2233/01; H01H 36/0033; H01H 2221/066; H01H 2223/042; H01H 2223/058; H01H 2223/054; H01H 2233/012; H01H 2233/034
See application file for complete search history.

(56) References Cited

U.S. PATENT DOCUMENTS

| | | |
|---|---|---|
| 5,519,053 A | 5/1996 | Kun et al. |
| 5,894,406 A | 4/1999 | Blend |
| 7,102,878 B2 | 9/2006 | Yu et al. |

(Continued)

FOREIGN PATENT DOCUMENTS

| | | |
|---|---|---|
| GB | 2097336 A | 11/1982 |
| TW | 201216034 A | 4/2012 |

*Primary Examiner* — Ahmed M Saeed
(74) *Attorney, Agent, or Firm* — Brooks, Cameron & Huesch, PLLC

(57) ABSTRACT

Example implementations relate to modular keyboards. In an example, a modular keyboard can include a keyboard module including keys, where the keyboard module includes a plurality of locking mechanisms, and a lattice removably coupled by the plurality of locking mechanisms to the keyboard module, where the lattice comprises a keyboard overlay.

15 Claims, 3 Drawing Sheets

(51) Int. Cl.
  *H01H 9/02* (2006.01)
  *G06F 3/02* (2006.01)

(56) References Cited

U.S. PATENT DOCUMENTS

| | | |
|---|---|---|
| D608,361 S | 1/2010 | Meyer et al. |
| 8,803,806 B2 | 8/2014 | Mundt et al. |
| 8,902,573 B2 | 12/2014 | Mizoguchi et al. |
| 9,128,532 B2 | 9/2015 | Yu et al. |
| 9,268,366 B2 | 2/2016 | Yu et al. |
| 2012/0068933 A1 | 3/2012 | Larsen |
| 2014/0090966 A1* | 4/2014 | Yu .................. H01H 13/705 200/5 A |
| 2014/0218890 A1* | 8/2014 | Wang ................ G02B 6/0055 362/23.03 |
| 2015/0332874 A1* | 11/2015 | Brock .................. H01H 13/83 200/5 A |

* cited by examiner

MODULAR KEYBOARD

BACKGROUND

Keyboards form integral parts of many computing systems. Many keyboards include a keyboard module and an overlay. The keyboard module may include keys. The overlay may include a material to provide structural, functional, and/or aesthetic qualities, among other qualities, to a keyboard module.

DETAILED DESCRIPTION

Figure 1:
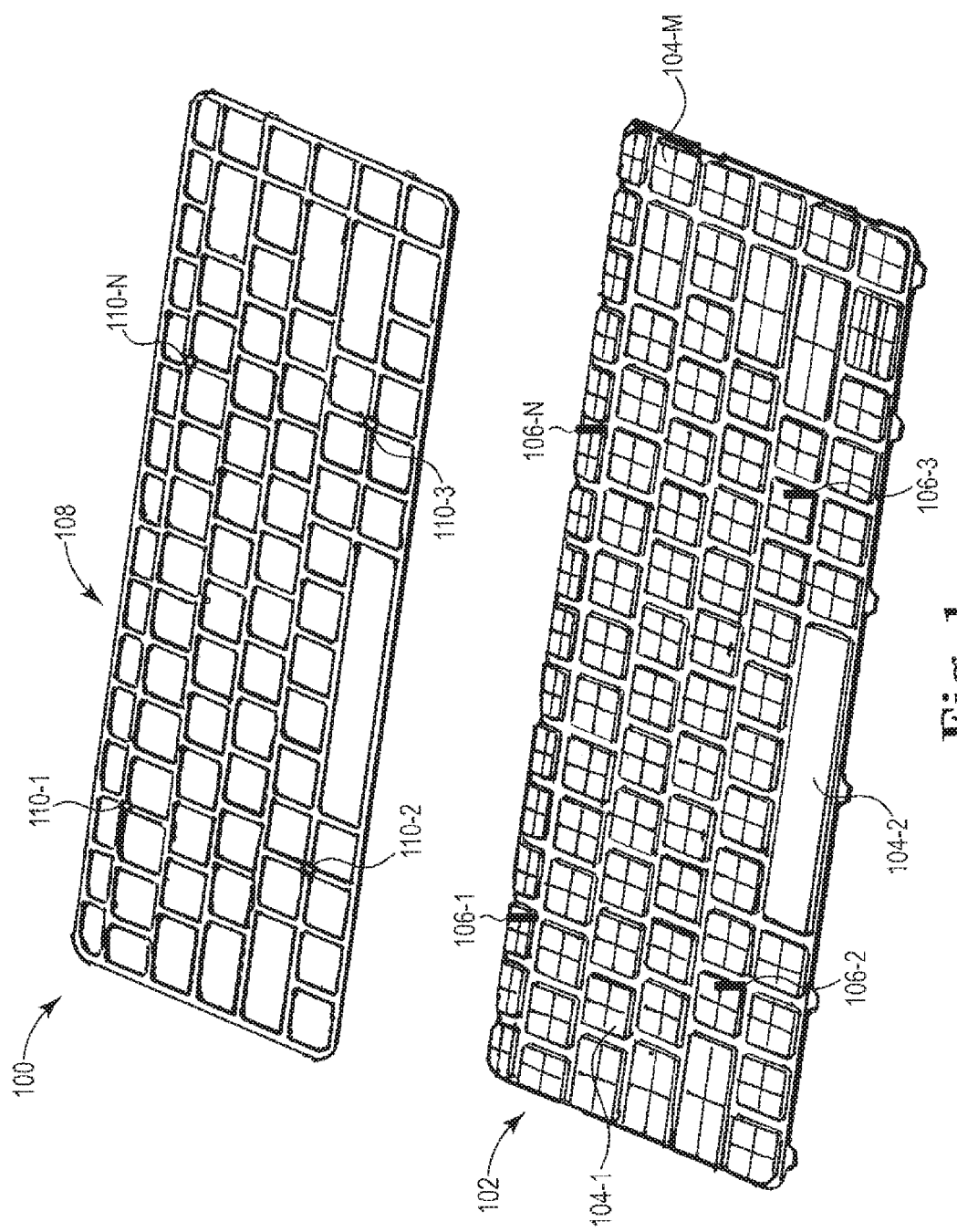
FIG. 1 is a diagram of an example of a modular keyboard device, according to the present disclosure.

Keyboard systems form integral parts of many computing systems. A keyboard system may include multiple components. The keyboard system may include a keyboard module. As mentioned and as used herein, a keyboard module refers to the component of a keyboard system containing the keys. Each of the individual keys of the keyboard module may contain a letter and/or a symbol. When the keyboard module is coupled to a computing device, pressing a key on the keyboard module may transfer the corresponding letter and/or symbol to the screen, allowing a user to provide inputs to the computing device.

The keyboard system may include a base deck to provide stability and support for each of the other components. For instance, in some examples, the keyboard module may sit in the base deck. For example, the base deck may include a portion to receive the keyboard module and/or couple the keyboard module to the base deck.

The keyboard system may include a lattice. As used herein, a lattice refers to an overlay with cutouts to fit over the keys on a keyboard module. The lattice may be used to protect the keyboard module while continuing to allow each of the individual keys of the keyboard module to be pressed.

In some approaches, a component of the keyboard system may be permanently bonded to those immediately adjacent to it. As used herein, being permanently bonded means to be coupled with a manner that cannot be decoupled without damage to a keyboard (e.g., such that the keyboard does not function and/or visually appear as intended). For example, in some approaches, each component of the keyboard system may be permanently bonded to those immediately adjacent to it. As used herein, being bonded can include a permanent coupling between a number of components. Bonding may be achieved by, for example, use of adhesive and/or by heat stacking.

For example, the keyboard module may be bonded to the base deck, such that the base deck provides stability and support for the keyboard module. In some approaches, the lattice may be permanently bonded to the keyboard module via adhesive or otherwise to provide permanent protection for the keyboard module. It may be desirable to allow an end user of a keyboard to customize a configuration, color, etc. of a keyboard. However, once the individual components of the keyboard system are permanently bonded to one another, it is difficult and/or impossible to separate the components and/or replace a component of the keyboard system without damaging the keyboard. As a result, such approaches may not permit customization.

A modular keyboard device according to the present disclosure allows for customization and more modifiability of a keyboard system. The modular keyboard device may include a base deck for stability, a keyboard module containing the keys, and a lattice to protect the keyboard module. The base deck and the keyboard module may be coupled to one another, and the lattice may be coupled to the keyboard module. The base deck and keyboard module may be permanently bonded, or they may be removably coupled. Further, the lattice may be removably coupled to the keyboard module. When the lattice is removably coupled to the keyboard module, the lattice may be removed without risking damage to the keyboard module, the lattice, and/or the base deck. Additionally, the lattice may be removed and a new lattice may be removably coupled to the keyboard module. By having the ability to remove a lattice without damaging the keyboard module, a user is able to customize the keyboard system through the use of different lattices.

FIG. 1 illustrates an example of a modular keyboard device 100 according to the present disclosure. As illustrated in FIG. 1, modular keyboard device 100 may include multiple components. For example, modular keyboard device 100 may include a keyboard module 102. Keyboard module 102 may include a plurality of keys 104-1, 104-2 . . . 104-M (collectively referred to hereinafter as keys 104). Keyboard module 102 may further include locking mechanisms 106-1, 106-2, 106-3 . . . 106-N (collectively referred to hereinafter as locking mechanisms 106).

Although FIG. 1 shows four locking mechanisms 106, additional locking mechanisms 106 or fewer locking mechanisms 106 may be utilized. Additionally, although locking mechanisms 106 are shown disposed among the keys 104 of keyboard module 102, examples are not so limited and other configurations of locking mechanisms 106 may be used. For example, a plurality of locking mechanisms may be disposed around the perimeter of keyboard module 102. Locking mechanisms 106 may also be disposed in a combination of locations in relation to keyboard module 102. For example, a first plurality of locking mechanisms 106 may be disposed among the keys 104 of keyboard module 102 and a second plurality of locking mechanisms 106 may be disposed around the perimeter of keyboard module 102. Locking mechanisms 106 will be further discussed herein in relation to FIG. 3.

Modular keyboard device 100 may further include a lattice 108. Lattice 108 may comprise a keyboard overlay designed to be coupled to the keyboard module 102 in an overlaying fashion. That is, the lattice 108 may overlay a portion of, but not all of, the keyboard module 102. For example, the lattice 108 may include a plurality of cutouts designed to fit over keys 104 of the keyboard module such that the lattice 108 can overlay the keyboard module 102 without overlaying the keys 104 of the keyboard module 102. Lattice 108 may be removably coupled to keyboard module 102 via the plurality of locking mechanisms 106, as described herein.

Each of the plurality of locking mechanisms 106 may include a pin coupled to the keyboard module 102. As used herein, a pin refers to a piece of material, such as plastic or metal, to couple lattice 108 to keyboard module 102. In some examples, an end of the pin may include a point, although examples are not so limited. In such examples, the point of the pin may be inserted into the keyboard module 102. The pin may further be permanently coupled to keyboard module 102. For example, the point of the pin may be bonded to keyboard module 102 using adhesive or other methods, such as welding, screwing, or peening.

The pin may further include a head located at the end opposite the point to engage lattice 108. In some examples, the head of the pin may be broader than a body of the pin. As used herein, a body of the pin refers to the portion of the pin connecting the point and the head. In some examples, a portion of the pin that includes the head, may extend above the keyboard module 102. In some examples, a portion of the pin may extend past the upper surface of the keyboard module 102. The portion of the pin extending past the upper surface of keyboard module 102 may correspond to an amount of the pin to engage with a receptacle located on lattice 108.

Each of the plurality of locking mechanisms 106 may further include a receptacle. The receptacle may be designed to receive and engage a corresponding pin. In some examples, the receptacle may be located on lattice 108, such that the receptacle engages when lattice 108 is placed over keyboard module 102. For example, the receptacle may be located on an underside of lattice 108 such that when lattice 108 is placed over keyboard module 102, the receptacle aligns with a corresponding pin. The receptacle may include a recess to receive the head of the pin. In some examples, the receptacle may further include a plurality of tabs to grasp the pin. The tabs may grasp the head of the pin, although examples are not so limited and the tabs may grasp the pin at other locations.

Locking mechanisms 106 may further comprise a plurality of pegs. As used herein, a peg refers to a piece of material that is substantially blunt on both ends and is used to couple two or more things together. In such examples, each of the plurality of pegs may be used to attach keyboard module 102 to a base deck (not shown in FIG. 1). The plurality of pegs may have a portion extending above the keyboard module 102. For example, the plurality of pegs may have a portion extending past the upper surface of the keyboard module 102. In such examples, the portion of the peg extending above keyboard module 102 may be removably coupled to a corresponding receptacle located on lattice 108. In some examples, the peg may be threaded such that it resembles a screw.

In some examples, each of the plurality of pegs may be permanently coupled to keyboard module 102. For example, each of the plurality of pegs may be molded as an integral part of the keyboard module 102, such that the plurality of pegs are formed as a part of the keyboard module 102. In some examples, each of the plurality of pegs may be bonded to the keyboard module 102. Regardless of a particular bonding mechanism, it is understood that the pegs may be permanently coupled to the keyboard module 102.

In some examples, when locking mechanisms 106 include a plurality of pegs, each of the plurality of receptacles located on lattice 108 may include a recess to receive a corresponding peg. In some examples, the recess may receive the portion of the peg extending above keyboard module 102 and frictionally engage the peg. In some examples, the recess may include a plurality of tabs to grasp the portion of the peg coupling with the receptacle.

Each of the plurality of locking mechanisms 106 may further include a release mechanism 110-1, 110-2, 110-3 . . . 110-N (collectively referred to hereinafter as release mechanism 110). The release mechanism 110 may be used to disengage the corresponding locking mechanism 106, thus decoupling lattice 108 from keyboard module 102. The release mechanism may be located on lattice 108. In some examples, the release mechanism 110 may disengage the peg or pin from the receptacle. For example, the release mechanism 110 may compromise a tab, wherein applying pressure to the tab disengages the portion of the receptacle that is engaged with the peg or pin. For instance, in some examples, each release mechanism of the plurality of release mechanisms may disengage a respective pin and/or a respective peg of the plurality of pins from a respective receptacle of the plurality of receptacles. However, examples are not so limited and the release mechanism 110 may be another type of mechanism that disengages locking mechanisms 106.

Figure 2:
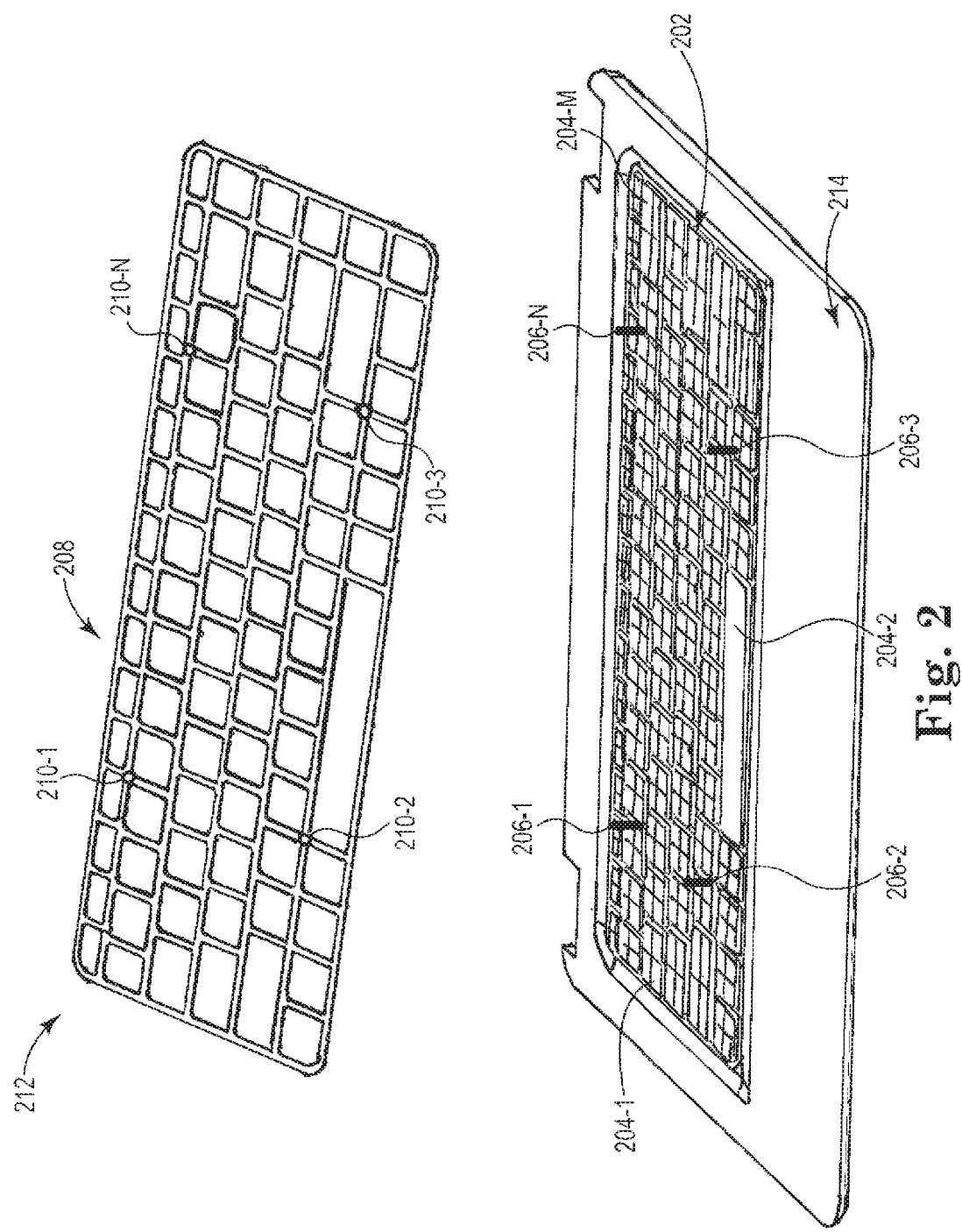
FIG. 2 is a diagram of an example of a system for a modular keyboard according to the present disclosure.

FIG. 2 illustrates an example of a system 212 for a modular keyboard according to the present disclosure. System 212 may include a base deck 214. Base deck 214 may include a receptacle to receive a keyboard module 202. As shown in FIG. 2, base deck 214 may extend past the edges of keyboard module 202. In some examples, the base deck 214 may be a different size to accommodate the keyboard module 202.

Keyboard module 202 may be the same or similar device as keyboard module 102, as shown in FIG. 1. Keyboard module 202 may include a plurality of key 204-1, 204-2 . . . 204-M (collectively referred to hereinafter as keys 204). Keys 204 may be the same or similar to keys 104, as shown in FIG. 1. As shown in FIG. 2, keyboard module 202 may be coupled to base deck 214. System 212 may include a plurality of locking mechanisms 206-1, 206-2, 206-3 . . . 206-N (collectively referred to hereinafter as locking mechanisms 206). Locking mechanisms 206 may be the same as or similar to locking mechanisms 106, as shown in FIG. 1. Locking mechanisms 206 are further discussed herein in relation to FIG. 3.

In some examples, keyboard module 202 may be coupled to base deck 214 by a plurality of removable pegs. The removable pegs may be inserted into aligning cutouts in keyboard module 202 and base deck 214. In such examples, neither keyboard module 202 nor base deck 214 are permanently coupled to one another, nor are keyboard module 202 or base deck 214 permanently coupled to the plurality of pegs.

In some examples, keyboard module 202 may be permanently coupled to base deck 214 by a plurality of permanently connected pegs. For example, keyboard module 202 may be coupled to base deck 214 via a plurality of pegs that are bonded to both keyboard module 202 and base deck 214. The plurality of pegs may be bonded to keyboard module 202 and base deck 214 by, for example, adhesive or heat stacking. In examples in which permanently coupled pegs are utilized, keyboard module 202 may not removable from base deck 214.

In some examples, a plurality of pegs may be permanently bonded to base deck 214 but not to keyboard module 202. The plurality of pegs may be molded as part of base deck 214 or they may be pieces that have been bonded to base deck 214. In such examples, the plurality of permanently bonded pegs may be disposed to securely hold keyboard module 202 in base deck 214. Thus, when base deck 214 receives keyboard module 202, keyboard module 202 may engage with the permanently bonded pegs.

For example, the pegs may fit between the keys 204 of keyboard module 202. In such examples, the pegs may secure keyboard module 202 to base deck 214 while allowing a user to press keys 204 on the keyboard module 202. In some examples, the permanently bonded pegs may be dispose around the perimeter of the receptacle of base deck 214 designed to receive keyboard module 202. In such examples, keyboard module 202 may include a plurality of cutouts disposed around its perimeter to engage with the plurality of permanently bonded pegs.

System 212 may further include a lattice 208. Lattice 208 may be the same as or similar to lattice 208, as shown in FIG. 1. Lattice 208 may be removably coupled to keyboard module 202 via the plurality of locking mechanisms 26.

In some examples, locking mechanisms 206 may comprise the removable pegs used to couple keyboard module 202 to base deck 214. In such examples, a removable peg may be used to couple keyboard module to 202 to base deck 214, with a portion of the peg extending above keyboard module 202. In some examples, the peg may extend past the upper surface of keyboard module 202. Receptacles located on lattice 208 may then receive the portion of the peg extending above keyboard module 202, thus coupling lattice 208 to keyboard module 202.

In some examples, locking mechanisms 206 may include pegs that are permanently coupled to keyboard module 202. In such examples, the pegs may further permanently couple keyboard module 202 to base deck 214. Similar to the removable pegs, the permanently coupled pegs may have a portion extending above the keyboard module 202 for receipt by lattice 208.

In some examples, lattice 208 may further be coupled to keyboard module 202 by a non-permanent adhesive. The non-permanent adhesive may be an adhesive that keeps lattice 208 from moving in relation to keyboard module 202 when utilized within a designed window of temperatures and/or pressures associated with operation of the keyboard by an end user yet allows for removal of lattice 208 by exposure of the lattice 208 to a temperature and/or a pressure in excess of those within the designed window of pressures associated with the operation of the keyboard yet without resulting in damage to the keyboard. In some examples, lattice 208 may be coupled to keyboard module 202 via a combination of locking mechanisms 206 and a non-permanent adhesive. Examples of non-permanent adhesives include, but are not limited to a pressure sensitive adhesive such as a pressure-sensitive acrylic based adhesive, among other types of non-permanent adhesives that may allow removal and/or reapplication of the lattice 208 to and/or from the keyboard.

System 212 may further include a release mechanism 210-1, 210-2, 210-3 . . . 210-N (collectively referred to hereinafter as release mechanism 210). Release mechanism 210 may be the same as or similar to release mechanism 110, as shown in FIG. 1. The release mechanism 210 may be located on lattice 208. Release mechanism 210 may disengage a corresponding locking mechanism 206 such that lattice 208 can be removed from keyboard module 202.

In some examples, the release mechanism 210 may utilize pressure to disengage the corresponding locking mechanism 206. In some examples, the release mechanism 210 may comprise a tab that can be disengaged by a user. In such examples, disengaging the tab also disengages the corresponding locking mechanism 206. However, examples are not so limited and the release mechanism 210 may be another type of mechanism that disengages locking mechanisms 206.

Figure 3:
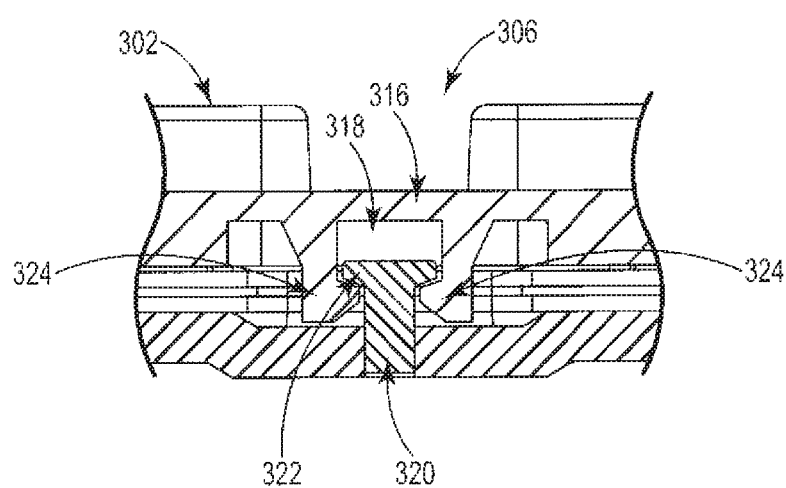
FIG. 3 illustrates an example of a locking mechanism for a modular keyboard device according to the present disclosure.

FIG. 3 illustrates an example of a locking mechanism 306 for a modular keyboard device according to the present disclosure. Locking mechanism 306 may be the same as or similar to locking mechanisms 106 and 206 of FIGS. 1 and 2, respectively. As previously described, locking mechanism 306 may include a pin such as pin 320. Pin 320 may be the same as or similar to the pins shown as part of locking mechanisms 106 and 206 in FIGS. 1 and 2, respectively. Examples are not so limited, however, and locking mechanism 306 may include a peg, a screw, or another type of fastener.

Pin 320 may include a head 322. Head 322 may be wider than a body of the pin 320, as shown in FIG. 3, although examples are not so limited. As previously described, pin 320 may be coupled to keyboard module 302. Keyboard module 302 may be the same as or similar to keyboard module 102 as referenced in FIG. 1 and keyboard module 202 as referenced in FIG. 2.

Locking mechanism 306 may further include a receptacle 316 to receive and engage pin 320. As previously described, receptacle 316 may be located on a lattice (e.g., lattice 108 as referenced in FIG. 1, lattice 208 as referenced in FIG. 2) such that when the lattice is coupled to a keyboard module, receptacle 316 may receive and engage pin 320. Receptacle 316 may include a recessed portion 318 to receive pin 320. For example, as shown in FIG. 3, recessed portion 318 may receive a portion of pin 320 including head 322. The recessed portion 318 of receptacle 316 may have two internal diameters. The first internal diameter may be narrower than the second internal diameter such that the recessed portion 318 of receptacle 316 is tapered.

Receptacle 316 may further include a plurality of tabs 324 to engage pin 320. As shown in FIG. 3, tabs 324 may engage pin 320 at the base of head 322. As used herein, the base of head 322 refers to the portion of head 322 that connects to the body of pin 320. Tabs 324 may be disposed at the base of recess 318, as shown in FIG. 3. As used herein, the base of recess 318 refers to the portion of recess 318 located furthest from the lattice and closest to the keyboard module when the lattice is coupled to the keyboard module. In some examples, tabs 324 may be located at a lower end of recess 318. For example, tabs 324 may be located at the end of the recess furthest from the lattice and closest to the keyboard module when the lattice is coupled to the keyboard module. Although two tabs 324 are shown, examples are not so limited and other numbers of tabs 324 may be used. Further, although tabs 324 are shown disposed at the base of recess 318, examples are not so limited.

Locking mechanism 306 may further include a release mechanism to disengage the locking mechanism 306. In some examples, the release mechanism may utilize pressure to disengage the corresponding locking mechanism 306. For example, pressure applied to the release mechanism may alter the position of the tabs 324 such that head 322 is able to move past tabs 324. In some examples, the release mechanism may comprise a tab that can be disengaged by a user and which thus disengages locking mechanism 306. Examples, however, are not so limited and a variety of release mechanisms may be used.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Further, as used herein, "a number of" an element and/or feature can refer to one or more of such elements and/or features. As used herein, the designators "M" and "N", particularly with respect to reference numerals in the drawings, indicates that a number of the particular feature so designated can be included with examples of the present disclosure. The designators can represent the same or different numbers of the particular features.

What is claimed:

1. A modular keyboard device, comprising:
a keyboard module including keys, wherein the keyboard module includes a plurality of locking mechanisms, wherein each locking mechanism extends above an upper surface of the keyboard module, and wherein each locking mechanism includes an integral pin permanently bonded to the keyboard module; and
a lattice, comprising a keyboard overlay, including:
a plurality of receptacles, wherein each of the receptacles is to house a head of an integral pin of a corresponding locking mechanism above the upper surface of the keyboard module to removably couple the lattice to the keyboard module,
a plurality of repositionable tabs, located at an end of the each of the receptacles furthest from the lattice, laterally repositionable between:
a first position to permit passage of the head of the integral pin of the corresponding locking mechanism into the receptacle, and
a second position to engage a portion of the integral pin of the corresponding locking mechanism above the upper surface of the keyboard module when the head of the integral pin of the corresponding locking mechanism is fully housed within the receptacle.

2. The device of claim 1, wherein the head of the integral pin has a first width and a body of the integral pin has a second width that is less than the first width.

3. The device of claim 2, wherein the plurality of repositionable tabs, when in the first position, defines a first passageway width of a passageway into the receptacle, wherein the first passageway width is greater than the first width of the head of the integral pin.

4. The device of claim 2, wherein the plurality of repositionable tabs, when in the second position, defines a first passageway width of a passageway into the receptacle, wherein the second passageway width is less than the first width of the head of the integral pin.

5. The device of claim 1, wherein each of the repositionable tabs includes a tapered surface extending from a leading edge of the receptacle toward a passageway into the receptacle.

6. The device of claim 1, further comprising a release mechanism, located on the lattice, actuatable to laterally flex the plurality of tabs preventing withdrawal of the head of the integral pin of the corresponding locking mechanism from within the corresponding receptacle to disengage from the portion of the integral pin of the corresponding locking mechanism to permit withdraw of the head from within the corresponding receptacle.

7. A modular keyboard system, comprising:
a base deck, to receive a keyboard, including a plurality of locking mechanisms, each locking mechanism including an extension, permanently connected to the base deck, to extend through and above an upper surface of the keyboard module;
the keyboard module coupled to the base deck; and
a lattice including:
a plurality of receptacles, and
a plurality of repositionable tabs, located at an end of each of the plurality of receptacles furthest from the lattice, laterally repositionable between:
a first position to widen a passageway into the receptacle to permit passage of a head of an extension of a corresponding locking mechanism into a corresponding receptacle, and
a second position to narrow the passageway into the receptacle to releasably engage a portion of the corresponding locking mechanism above the upper surface of a keyboard module, when the head of the extension of the corresponding locking mechanism is fully housed within the corresponding receptacle, to removably couple the lattice to the keyboard module by the plurality of locking mechanisms.

8. The system of claim 7, wherein:
each locking mechanism is a peg; and
the portion of the corresponding locking mechanism above the upper surface of the keyboard module is a portion of the peg dimensioned to be releasably engaged by a corresponding receptacle by a friction fit within the corresponding receptacle, thereby coupling the lattice to the keyboard module.

9. The system of claim 7, wherein the lattice is additionally coupled to the keyboard module by a non-permanent adhesive.

10. The system of claim 7, wherein:
the plurality of locking mechanisms includes a plurality of pegs permanently coupled to the keyboard module.

11. The system of claim 7, wherein the plurality of repositionable tabs are positioned about a mouth of a corresponding receptacle to flex, responsive to an insertion of the head of the extension of the corresponding locking mechanism, away from a center of the corresponding receptacle.

12. The system of claim 7, further comprising a release mechanism located on the lattice to alter, responsive to pressure, a position of a tab of the plurality of repositionable tabs to reversibly disengage an inserted locking mechanism by flexing away from a center of a corresponding receptacle to widen a passageway out of the receptacle.

13. A removable lattice device, comprising:
an overlay to cover a keyboard module; and
a plurality of receptacles, wherein each of the plurality of receptacles includes a plurality of repositionable tabs about a mouth of the each of the plurality of receptacles to releasably engage with a portion of a corresponding pin protruding through and above an upper surface of the keyboard module to couple the removable lattice device to the keyboard module via a plurality of pins, wherein the pins are coupled to the keyboard module, and wherein the plurality of repositionable tabs are repositionable between:
a first position to widen a passageway into the receptacle to permit passage of a head of the corresponding pin into a corresponding receptacle, and
a second position to narrow the passageway into the receptacle to releasably engage with the portion of the corresponding pin above the upper surface of the keyboard module, when the head of the pin of the corresponding locking mechanism is fully housed within the corresponding receptacle.

14. The device of claim 13, wherein each of the plurality of repositionable tabs include a tapered surface to guide the repositionable tabs away from a center of the receptacle responsive to an insertion of the head of the pin into the receptacle along the tapered surface.

15. The device of claim 13, comprising a plurality of release mechanisms located on the plurality of receptacles, wherein each release mechanism of the plurality of release mechanisms is to disengage a respective pin of the plurality of pins from a respective receptacle of the plurality of receptacles by flexing the repositionable tabs away from a center of the receptacle.

* * * * *